(No Model.)
C. THOMPSON.
FIFTH WHEEL FOR VEHICLES.
No. 395,017. Patented Dec. 25, 1888.
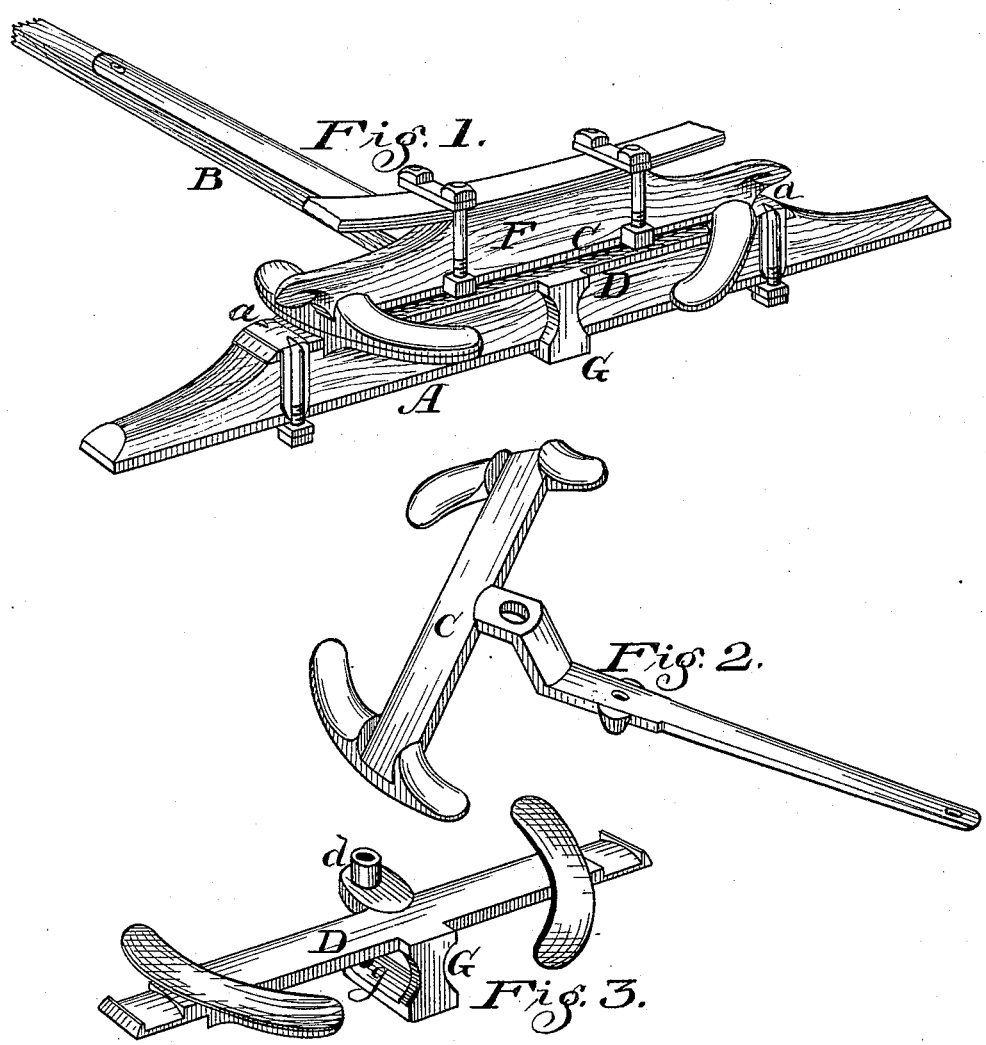
Witnesses,
H. A. Crossley.
Geo. B. Tibbitts.
Inventor,
Charles Thompson,
Attorney Geo. W. Tibbitts

UNITED STATES PATENT OFFICE.

CHARLES THOMPSON, OF FREMONT, OHIO.

FIFTH-WHEEL FOR VEHICLES.

SPECIFICATION forming part of Letters Patent No. 395,017, dated December 25, 1888.

Application filed November 21, 1887. Serial No. 255,818. (No model.)

*To all whom it may concern:*

Be it known that I, CHARLES THOMPSON, a citizen of the United States, residing at Fremont, in the county of Sandusky and State of Ohio, have invented certain new and useful Improvements in Fifth-Wheel Irons for Vehicles, of which the following is a specification.

My improvement relates to fifth-wheel irons for running-gear of carriages or wagons, and has for its object to simplify and lessen the number of parts comprising such gear by the peculiar construction and combination hereinafter described, and pointed out in the claim.

In the accompanying drawings, Figure 1 is a perspective view of fifth-wheel gear embodying my improvement. Fig. 2 is a detached view of the top fifth-wheel plate, having a rearwardly-extending reach-brace. Fig. 3 is a detached view of the under fifth-wheel plate, which contains the particular features of my improvement.

A is an axle, and B is the reach. These parts of a vehicle are united by means of mechanism comprising a fifth-wheel having the king-bolt in the rear of the axle, which was the subject of Patent No. 277,725, dated May 15, 1883.

C is the upper fifth-wheel plate, which is secured to the bolster E by clips *e e*, and has a rearwardly-projecting brace-iron, which is bolted to the reach B.

D is the lower fifth-wheel plate, which is secured to the axle by means of screws or clips *a a*. This plate has a middle rear projection, *d*, having an eye through which the king-bolt passes.

In the aforesaid patent there is a lower axle-plate having a middle rear projection with an eye for the king-bolt, and this plate is secured under the axle by means of the said clips *e e*. In my present application I dispense with this bottom plate and provide the said lower fifth-wheel plate, D, with a front middle downwardly-projecting arm, G, having an under and rearward extension, *g*, provided with an eye through which the king-bolt passes.

In Fig. 3 the part G is shown as being made or cast with the plate D; but this is not necessary, as said part G may be made as a separate piece and secured to the axle-tree by means of a bolt or screws, the main purpose of said piece being to support the lower end of the king-bolt; or this piece may be made to entirely surround the axle and be made in ornamental form. By providing the extension G to the lower plate, D, a suitable support for the lower end of the king-bolt is provided, which permits of doing away with the lower axle-plate heretofore used, and renders the gear less cumbersome and lighter and neater in appearance.

Having described my invention, what I claim, and desire to secure by Letters Patent, is:—

In running-gear for vehicles, the combination, with the axle, reach, bolster or head-block, and king-bolt located in rear of the axle, of the fifth-wheel plates C D, plate C, having rearwardly-extending brace, with eye for king-bolt, and the lower plate, D, with its front, downward, and rearward under extending arm, G, having an eye for the king-bolt, and each of said plates provided with the front and rearward extending sub-irons, all constructed and operating substantially as described.

CHARLES THOMPSON.

Witnesses:
THOMAS MCSHEEHY,
T. O'FARRELL.